(12) United States Patent
Casellini

(10) Patent No.: US 6,404,860 B1
(45) Date of Patent: Jun. 11, 2002

(54) SYSTEM AND METHOD FOR INTERNET CALL MANAGEMENT WITH TEXT-TO-SPEECH MESSAGING

(75) Inventor: Theodore E. Casellini, Cambria, CA (US)

(73) Assignee: SS8 Networks, Inc., San Jose, CA (US)

( * ) Notice: Subject to any disclaimer, the term of this patent is extended or adjusted under 35 U.S.C. 154(b) by 0 days.

(21) Appl. No.: 09/501,059

(22) Filed: Feb. 9, 2000

(51) Int. Cl.7 .......................... H04M 1/64; H04L 12/66
(52) U.S. Cl. .............................. 379/88.17; 379/215.01; 370/352
(58) Field of Search .................. 379/93.23, 142, 379/210, 211, 212, 88.19, 88.17, 88.13, 88.12, 88.11, 88.21, 204, 215.01, 93.35, 88.2, 88.16, 93.15, 93.17; 370/352

(56) References Cited

U.S. PATENT DOCUMENTS

| | | | |
|---|---|---|---|
| 5,327,486 A | * | 7/1994 | Wolff et al. .............. 379/93.23 |
| 5,548,636 A | * | 8/1996 | Bannister et al. ........... 379/201 |
| 5,742,905 A | * | 4/1998 | Pepe et al. .................. 455/461 |
| 5,805,587 A | * | 9/1998 | Norris et al. ................ 370/352 |
| 5,809,128 A | * | 9/1998 | McMullin .............. 379/215.01 |
| 5,946,386 A | * | 8/1999 | Rogers et al. ......... 379/265.09 |
| 5,963,626 A | * | 10/1999 | Nabkel .................. 379/142.01 |
| 6,005,870 A | * | 12/1999 | Leung et al. ............... 379/201 |
| 6,219,413 B1 | * | 4/2001 | Burg .......................... 379/215 |

* cited by examiner

Primary Examiner—Fan Tsang
Assistant Examiner—Ovidio Escalante
(74) Attorney, Agent, or Firm—Pennie & Edmonds LLP

(57) ABSTRACT

A call management system provides an Internet call management service that permits a subscriber to receive information about incoming calls, and provides a personal message to the caller over a voice channel. The caller may be given a personal notification, as a spoken audio message that includes the callers's name, advising the caller that a personal message is forthcoming and requesting that the caller stand by to receive the personal message. The subscriber enters the personal message as text, which is transmitted over a data channel to the call management system. The call management system converts the text message into speech, and then "reads" the message as a spoken, audio message to the caller, using the voice channel over which the call was received by the call management system.

16 Claims, 7 Drawing Sheets

SYSTEM AND METHOD FOR INTERNET CALL MANAGEMENT WITH TEXT-TO-SPEECH MESSAGING

The present invention relates generally to communications systems, and specifically to systems and methods for providing telephone call management services that include Internet capability, permitting the subscriber to be alerted about calls or respond personally to calls over the Internet.

BACKGROUND OF THE INVENTION

Call management applications provide subscribers with options for handling incoming telephone calls, such as forwarding a call to another number, or to voicemail. These options may be exercised in response to a command sent by the subscriber on receipt of the call. The call management system may provide the subscriber with information about the caller, such as the callers's name or calling line identification (CLID), and the subscriber may select an option for handling the call based upon this information. Alternatively, various options may be exercised automatically by the call management system based upon information about the incoming call, for example the callers's CLID or the date or time of day of the call. Options may also be exercised by the call management system if the subscriber does not pick up the call, or indicates that he is busy.

Some call management applications include Internet call management capabilities, permitting the call management system to communicate with a subscriber's computer via the Internet. A subscriber's computer is any device that includes a central processing unit (CPU) connected to a memory and a network connection, with a display user interface. An exemplary user interface for a prior art Internet call management system is shown in FIG. 1. The subscriber's computer display "desktop" 100 includes a call manager window 101, with notification of an incoming call 101a and a list of options for handling the call 101b.

The steps used by a prior art Internet call management system to handle an incoming call are shown in FIG. 2. Initially, a call to the subscriber is directed to the callers's telephone or other communication device, such as a mobile wireless handset (200). If the caller is available to answer the call (201) and answers the call (202), then no further action is required. However, if the called number is busy, or the subscriber does not answer the call (201-No), the call is redirected to a call management system (203). At this point in the call flow, if the subscriber is accessible via the Internet he (or she) can receive notification 101a of the call (205), including CLID information, at the subscriber's computer or other suitable device. The notification message is typically sent via a data channel over the Internet. In response, the subscriber can select (206) a preset call handling option, such as transfer to voicemail, for handling the call. Another subscriber selectable option may be to have the system deliver (i.e., in the form of speech) one of a small number of pre-recorded generic messages to the caller. If the user selects one of the presented options within a predetermined period of time, the system handles the call according the user selected option (208), and otherwise performs a default action (207), such as directing the call to voicemail. In FIG. 1, the highlighted selections indicate that the user has chosen to respond with a pre-recorded message, and has selected a pre-recorded message indicating that he will return the call.

There are certain limitations to the prior art Internet call management approach. The caller is handled in a generic and impersonal way, by either being forwarded to another number or to voicemail without any personal acknowledgment of the call, or by playing a pre-recorded, generic message. The caller cannot be contacted by the subscriber and given a personal message without requiring the subscriber to actually take the call. It is therefore desirable to provide an Internet call management system that allows the subscriber to give the caller a personal response in real time without direct, duplex communication between the subscriber and the caller.

SUMMARY OF THE INVENTION

In summary, the present invention is a system and method for alerting a subscriber to incoming calls by sending a message to the subscriber's computer via a data channel, and permitting the subscriber to respond with a personal message transmitted to the call management system from the subscriber's computer via a data channel. The system then forwards the message, which may be translated from text to speech, to the caller via a voice channel. Before the personal message is forwarded to the caller, the call management system may request the caller, in a personal notification message, using the callers's name, to wait for a personal message from the subscriber.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

In the present invention, the call management system can alert the subscriber of incoming calls by sending a notification to the subscriber's computer via a data channel, such as the Internet, and the subscriber can provide a personal text-to-speech message to the caller without full duplex communication. The text message is forwarded to the call management system via the Internet, and the call management system translates the text to speech (i.e., into an audio message, also called a spoken message) and "reads" the spoken message to the caller over a voice channel. While the subscriber is typing the text message for transmission over the Internet, the call management system may optionally play a personal notification message, using the callers's name, asking the caller to stand by for a personal message from the subscriber. The callers's name may be derived from CLID information received by the call management system with each inbound call.

Figure 3:
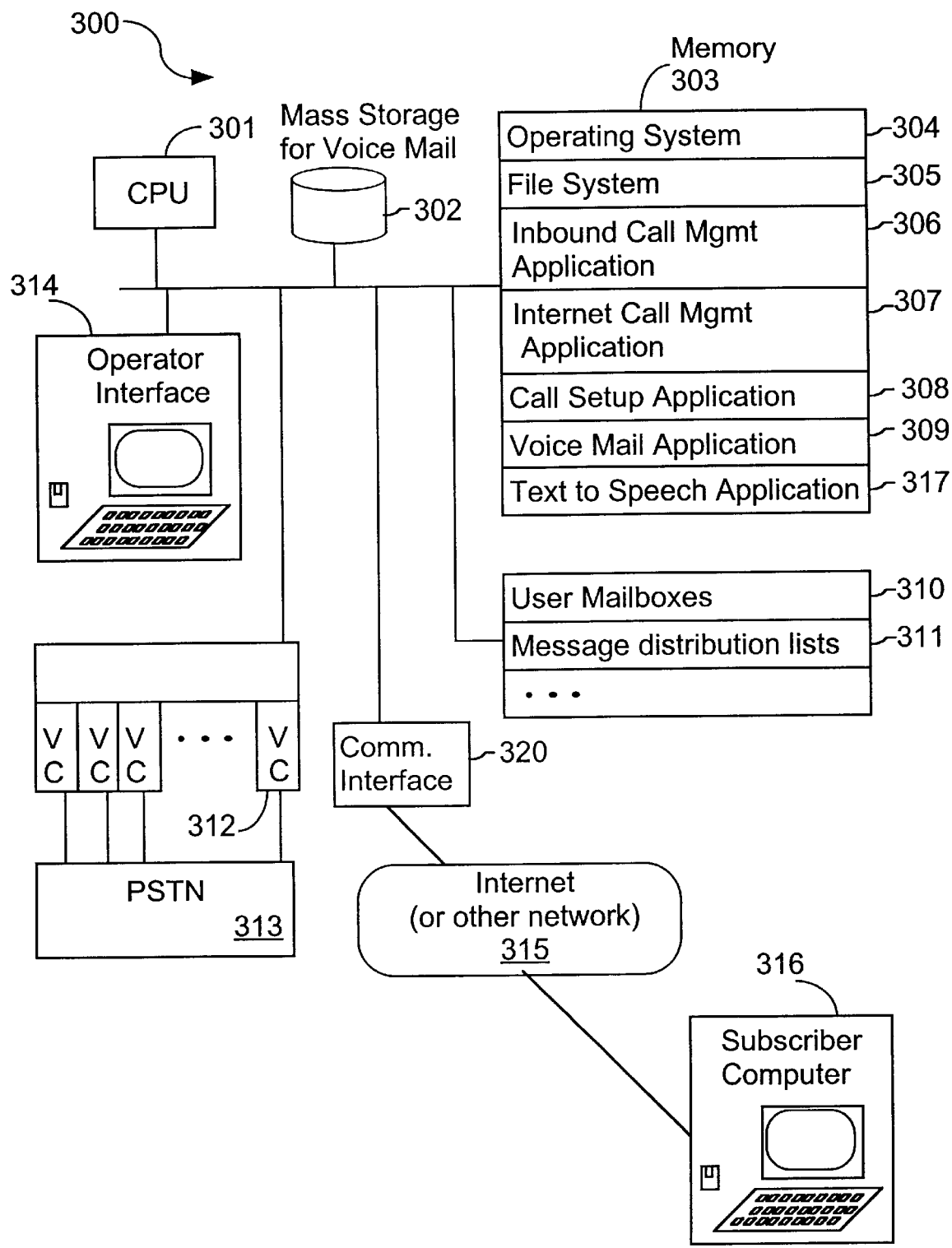
FIG. 3 is block diagram of a call management system with Internet capability in accordance with one embodiment of the invention.

FIG. 3 is a block diagram of a call management system 300, also called the call management center. The call management system includes a central processing unit 301, and memory 303 for storing an operating system 304, a file system 305, and several applications for handling calls. The operating system and file system provide basic system services such as input/output operations, process management, and file management. Memory 303 also stores various data structures used by the internal voicemail system, including user mailboxes 310 and message distribution lists 311, while the compressed audio data comprising the messages stored by the voicemail system are stored on mass storage 302.

Telephone calls are directed to the call management system 300 by the public telephone network 313 in accordance with each subscriber's "public" telephone number. The subscriber's public telephone number is typically a direct inward dial telephone number assigned to the call management system 300. The subscriber will also generally have a number of private telephone numbers, including telephone numbers for the subscriber's mobile handset, home and office telephone numbers, facsimile telephone numbers and so on. Whenever the call management system 300 receives a telephone call on behalf of a subscriber, the call is received by one of the system's voice cards 312, which receives from the public telephone network 313 both the direct inward dial number that is being called, and the CLID of the caller, as well as other call parameters that are not relevant to the present discussion. This information is passed by the voice card 312 to an inbound call management application 306.

A communications interface 320, such as a network interface card, provides data channels from the call management system 300 via the Internet 315, or other data communications network, to the computers 316 used by the system's subscribers.

The inbound call management application 306 examining incoming call data and identifies the subscriber and the caller. It may identify the callers's name, based on the telephone number of the caller, using a look-up table of frequent or likely callers and all the known telephone numbers associated with each caller. Alternatively, the callers's name may be provided as part of the CLID information by the public telephone network 313.

The inbound call management application 306 also manages the other applications for handling calls: an Internet call management (ICM) application 307, a call setup application 308, a voicemail application 309, and any other call handling applications that the call management system may use. The internal voicemail application 309 records voicemail messages for subscribers, storing the messages on mass storage 302 in the call management system 300. The call setup application 308 handles call forwarding and other call routing options. Various options for voicemail and for call routing may be used, which are described in related patent application Ser No. 09/501,058, entitled "System and Method for Call Management with Voice Channel Conservation," filed on the same date as the present application, which is hereby incorporated by reference in its entirety as background information. These various voicemail and routing options are not relevant to the present discussion.

Figure 4A:
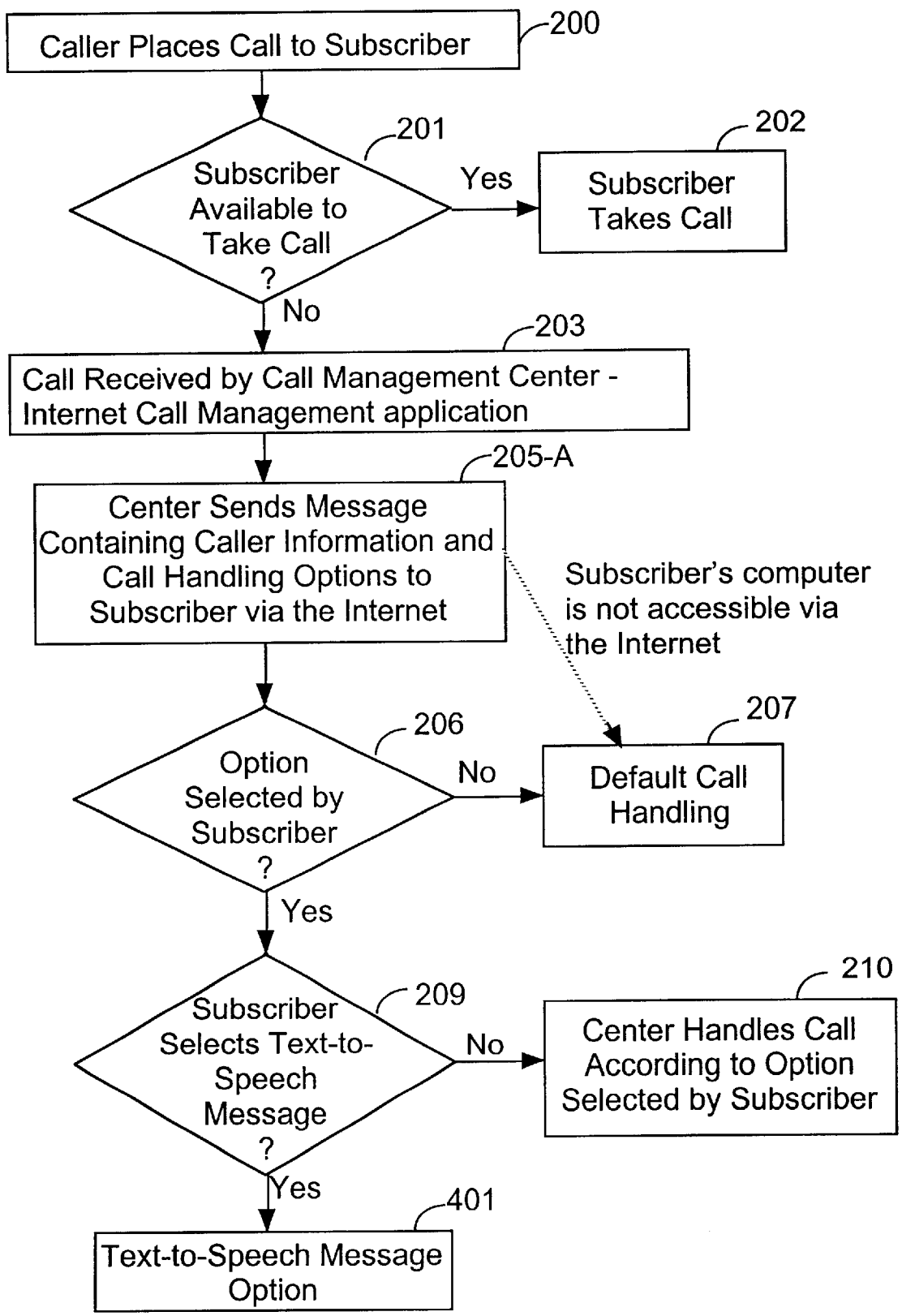
FIGS. 4A and 4B are flowcharts of the steps for handling an incoming call in accordance with two embodiments of the invention.
Figure 4B:
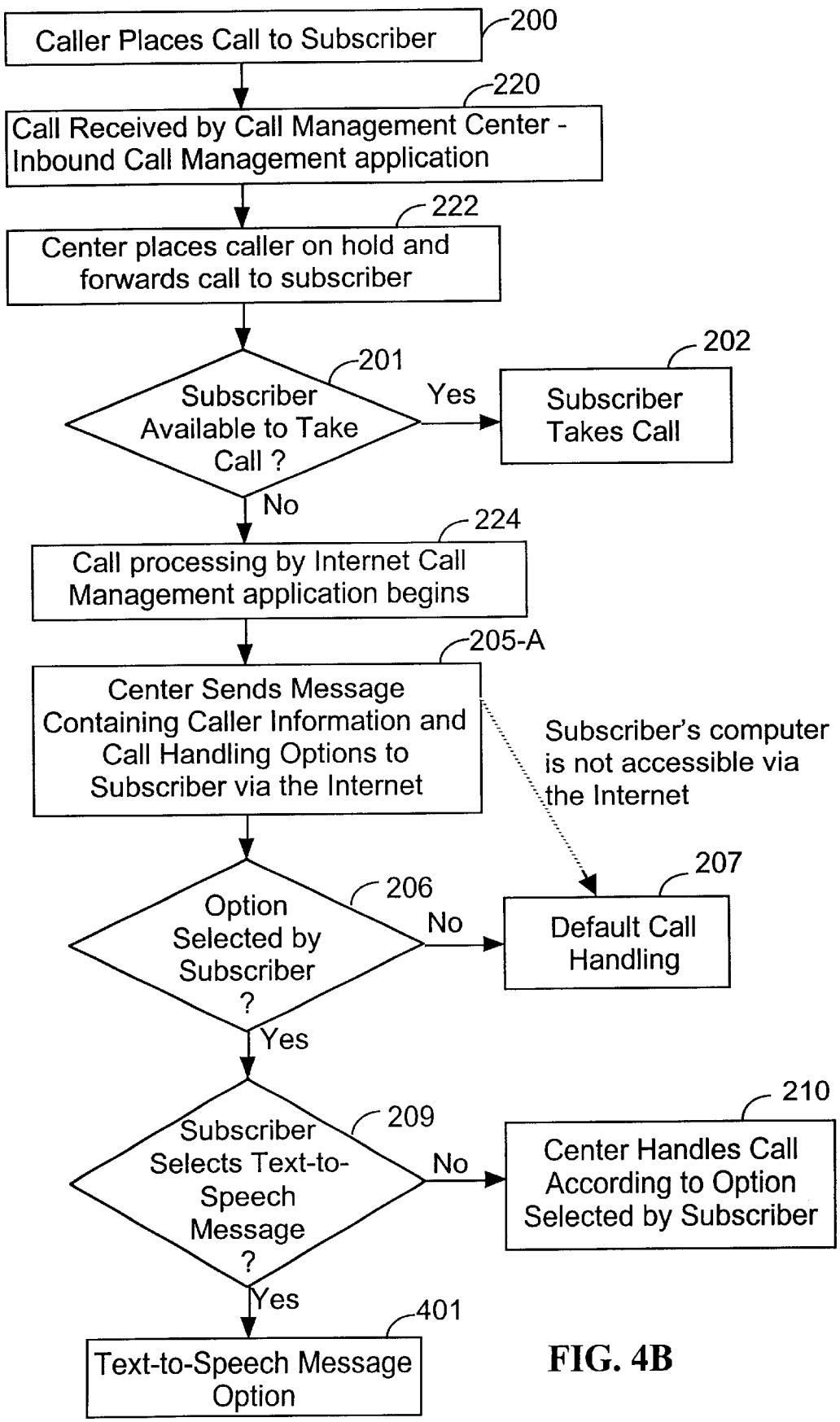

FIGS. 4A and 4B represent two different embodiments of the invention. In the first (FIG. 4A), calls are initially directed to the subscriber's telephone or other communications device associated with the called number. A call is redirected to the call management system only when the called number is busy or not answered. In the second embodiment (FIG. 4B) calls to the subscriber's telephone number are initially directed to the call management system. The second embodiment is suitable for users who use "one telephone number" and a call management system to redirect calls to various other telephone numbers (which may be a private, unpublished numbers), depending on where the subscriber is currently located. In the second embodiment, the call management system can perform numerous functions, such as call screening and intelligent tracking of the best number to reach the subscriber, which are outside the scope of this document.

Figure 1:
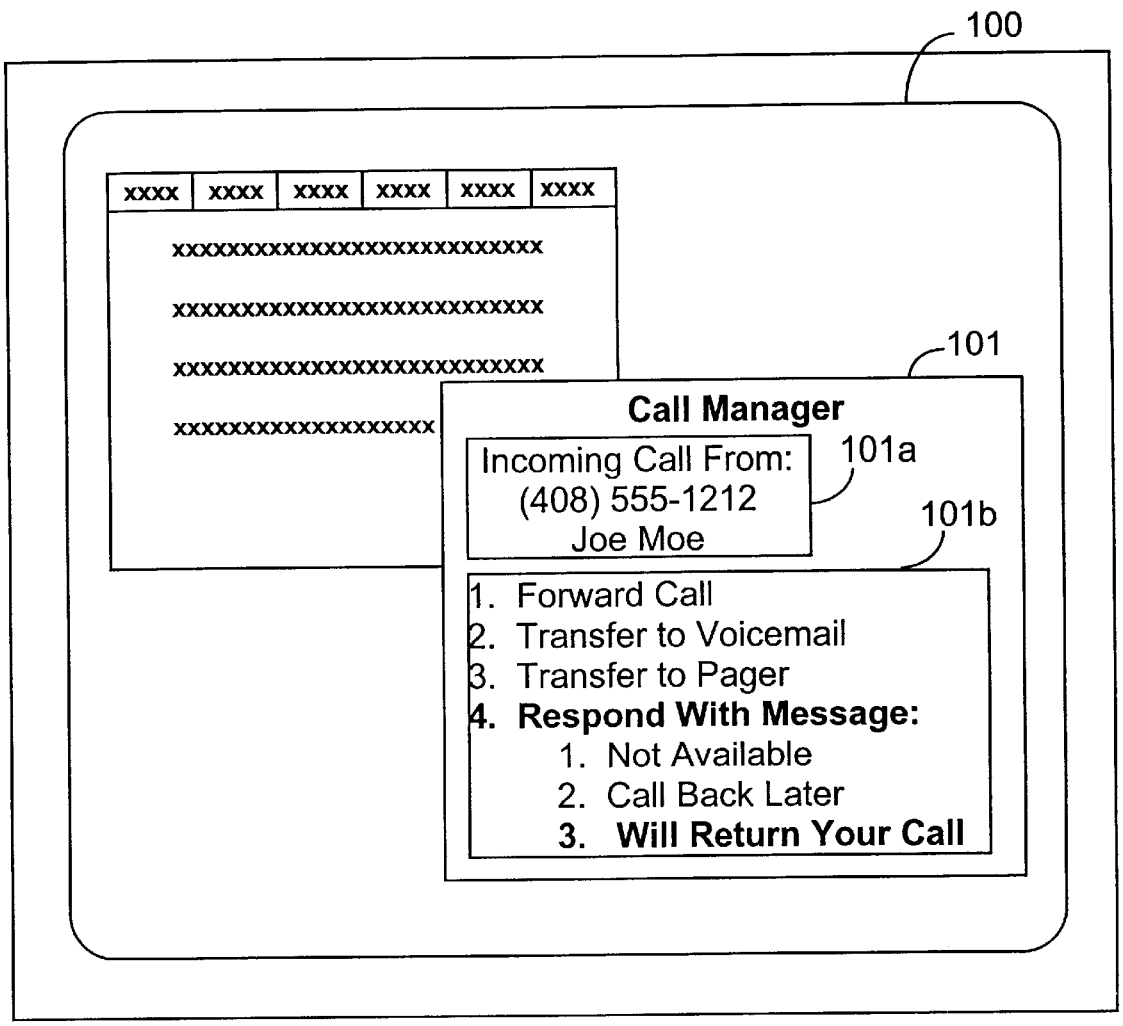
FIG. 1 is an illustration of a subscriber's user interface for a prior art Internet call management system.
Figure 2:
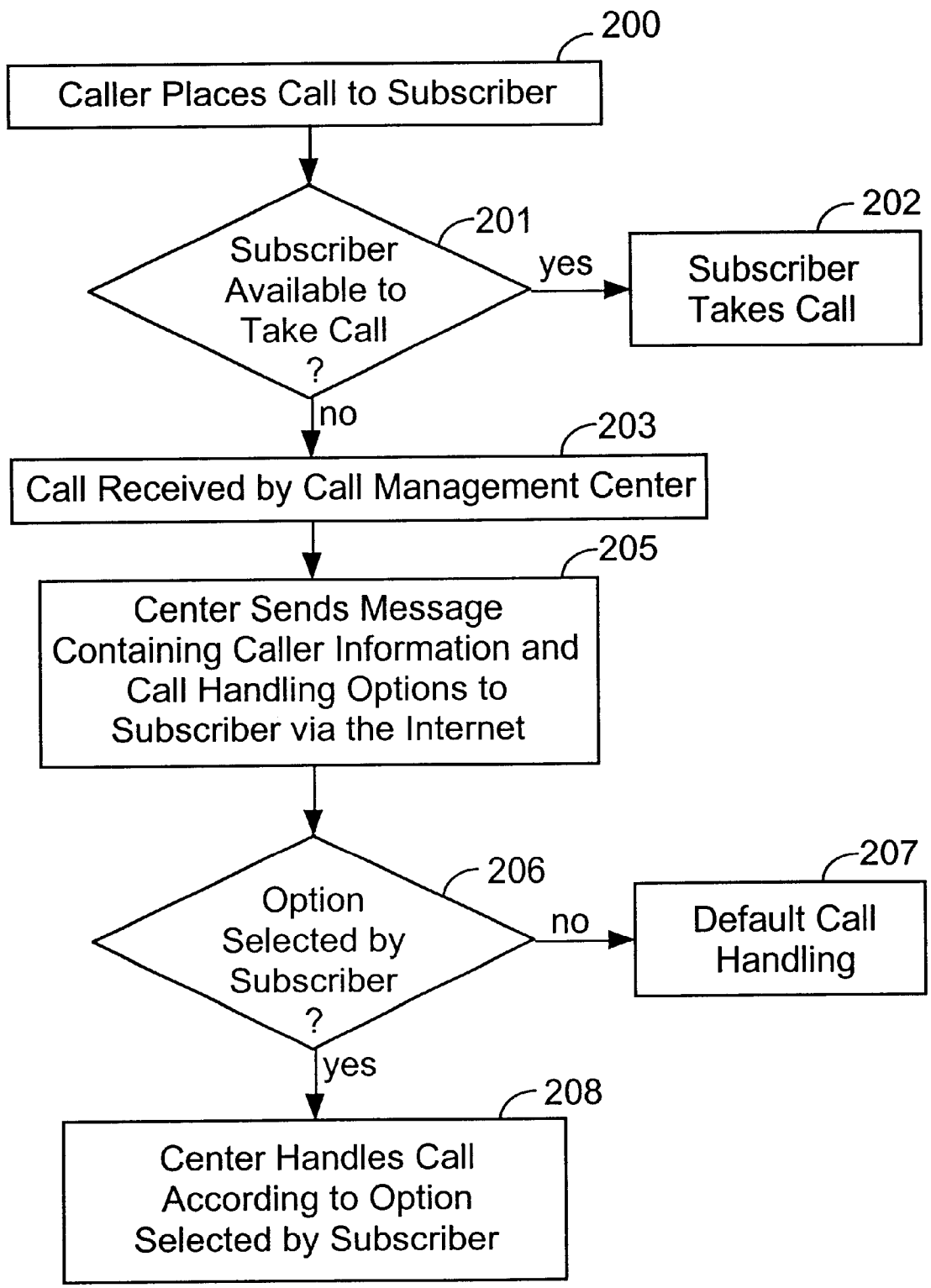
FIG. 2 is a flow chart of the steps used by an exemplary prior art Internet call management system for handling an incoming call.

Referring to FIG. 4A, the initial handling of a call by a caller to the subscriber is the same as described above with respect to FIG. 2 (steps 200, 201, 202, 203). Once the call is transferred to the call management system (203), the system handles the inbound call using its Internet call management application (ICM) 307. The ICM application 307 determines whether the subscriber's computer is currently accessible via the Internet 315. This may be done in any of a number of ways well known to those skilled in the art, including sending a "ping" to the Internet protocol address (IP address) associated with the user, or sending a message to the user's computer that includes a request for an immediate receipt, and then waiting to see if the user's computer returns the requested receipt.

If the ICM application 307 determines that the subscriber's computer is currently accessible, the ICM application 307 sends a notification (205-A) to the subscriber's computer 316 via the Internet 315. In some embodiments the call management system does not first check on the availability of the subscriber's computer, and instead just sends the notification message. In general, the lack of a timely response by the subscriber to the notification message is logically equivalent to the subscriber's computer not being accessible via the Internet. Also, in an alternate embodiment notification messages and subscriber responses are conveyed via data channels over a network other than the Internet.

Figure 6:
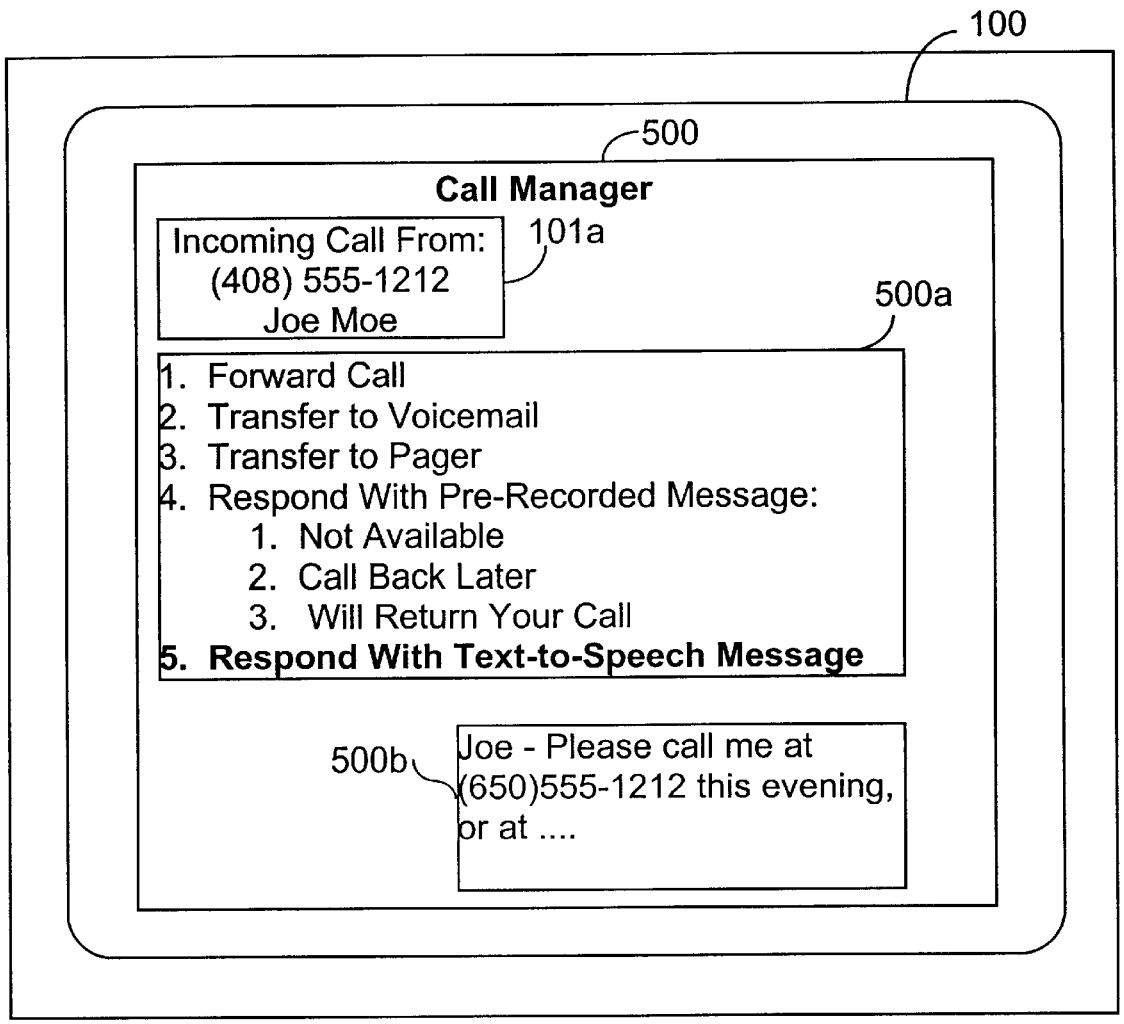
FIG. 6 is an illustration of a subscriber's user interface for an Internet call management system in accordance with an embodiment of the invention.

The notification message will typically include CLID information or the callers's name, as shown at 101a in FIG. 6. The message sent by the call management system to the subscriber via the Internet (205-A) is somewhat different from that described above. In particular, included in the set of call handling options presented to the subscriber is a new option—to enter a text message that will be read to the caller by the system, as shown at 500a in FIG. 6. In an alternate embodiment, these options may be durably stored on the subscriber's computer (or other device to which the notification message is sent) and displayed on receipt of a call notification from the call management system, thereby decreasing the bandwidth needed to convey the call notification message. If the subscriber's computer is not accessible via the Internet (205-A), the ICM application 307 resorts to default call handling (207), such as directing the call to voicemail.

If the subscriber selects an option other than the text-to-speech message option (209-No), the inbound call management application 306 handles the call according to the option selected by the subscriber (210). If the subscriber fails to timely select an option, the system performs a default action (207), such as directing the call to voicemail.

Figure 5:
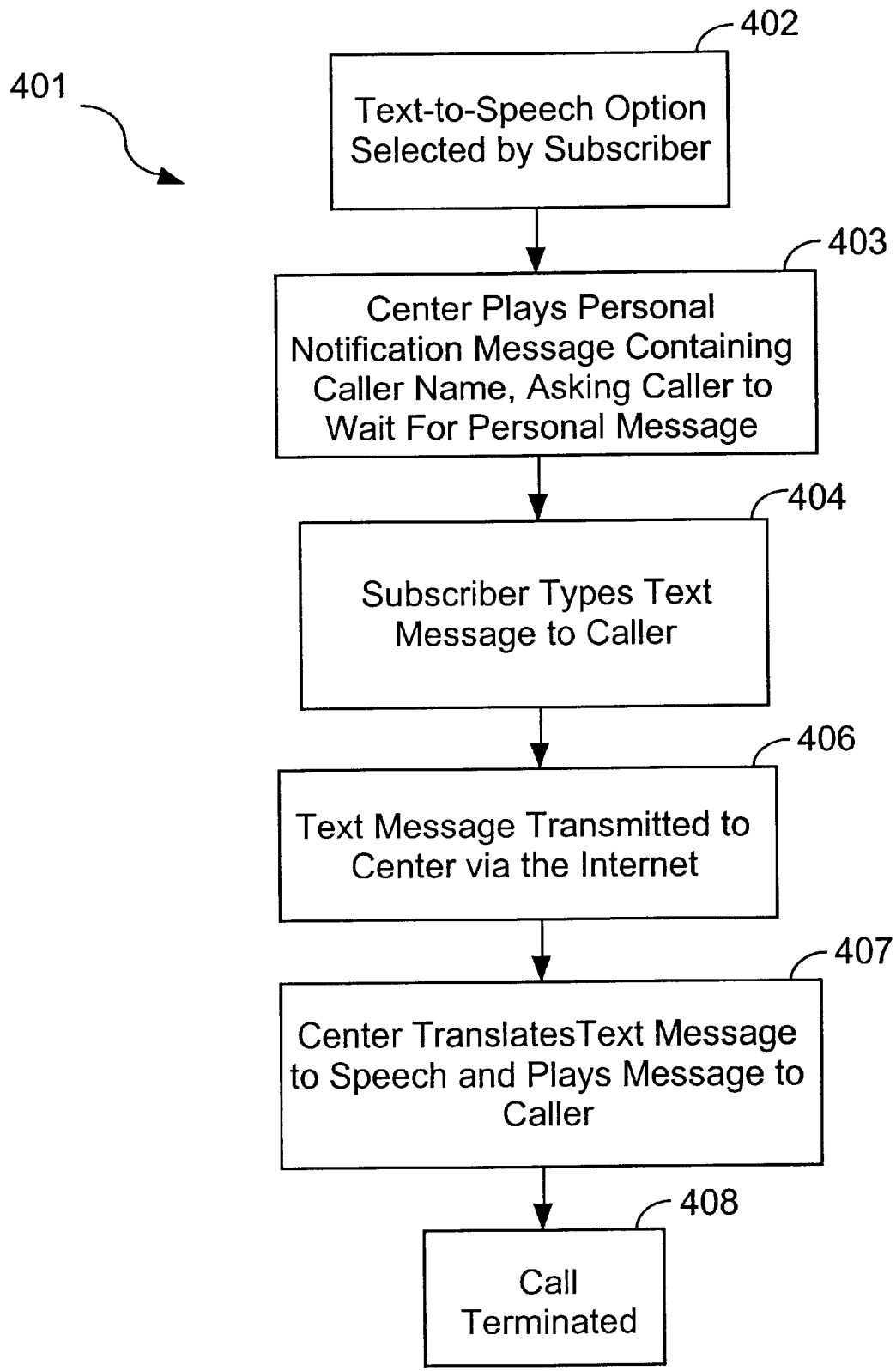
FIG. 5 is a flowchart of the steps for handling an incoming call under the text-to-speech option in accordance with an embodiment of the invention.

If the subscriber selects the text-to-speech message option (209-Yes—FIG. 4A, 402—FIG. 5), shown in FIG. 6, the ICM application 307 performs (401) the steps indicated in FIG. 5. Based on the callers's CLID information, provided to the ICM application 307 by the inbound call management application 306, the ICM application determines the callers's name, if it has not already been determined by the inbound call management application 306.

The ICM application 307 then plays a personal notification audio (spoken) message (403), including the callers's spoken name, informing the caller that a message from the subscriber is forthcoming and requesting that the caller stand by to receive the message. While this notification is being played, a text box 500b is displayed on the subscriber's desktop 500, as shown in FIG. 6, and the subscriber types in the text message into the text box (404). When the message is complete, the subscriber indicates that the message is ready to transmit, for example by pressing "enter," and this transmits the message via the Internet to the call management system 300 (406). The text message is received by the ICM application 307, which "reads" the message (as an audio/spoken message) to the caller over the voice channel (407), using a standard text-to-speech application 317 (FIG. 3). After the message has been played, the call may be terminated (408). Alternatively, the caller may be given other options, for example, to transfer the call to voicemail or to send a pager message to the subscriber.

Referring to FIG. 4B, the same basic call handling methodology can be used in systems where all calls to a subscriber are initially directed to a call management system. In particular, once a caller places a call to the subscriber (200), the call is received by the call management center (220) under the control of the inbound call management application 306, which puts the caller on hold and tries to forward the call to the subscriber at whatever telephone number or other communication address it has been programmed to use to reach the subscriber (222). If the subscriber is available to take the call (201-Yes), the subscriber answers the call (202). If the subscriber is not available (201-No), the call management center invokes the Internet call management application 307 (224), which tries to send a notification message to the subscriber via the Internet or other data communication network (205-A). From this point on, all aspects of the methodology of the invention are the same as described above with respect to FIG. 4A.

The present invention can be implemented as a computer program product that includes a computer program mechanism embedded in a computer readable storage medium. For instance, the computer program product could contain the program modules shown in FIGS. 3–5. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Alternate Embodiments

While the present invention has been described with reference to a few specific embodiments, the description is illustrative of the invention and is not to be construed as limiting the invention. For example, a data channel other than the Internet, such as an Intranet or other public or private network, may be used to send call notification to and receive text messages from a subscriber's computer. Although the description above has focused primarily on sending a text-to-speech message, the invention is not so limited. The subscriber may provide a message using voice over IP, or may record a voice message on his PC and transmit it to the call management center.

The order in which certain steps are performed, such as transmitting the personal notification to the caller and the subscriber's entering the text message, is not a critical feature of the invention. The presence of certain steps is not required to practice the invention. For example, the call management system may check to determine whether a subscriber is on the Internet before transmitting incoming call notification to the subscriber, but need not do so. The personal text-to-speech message may optionally include the callers's spoken name, derived for example from CLID information. The personal notification message may optionally be omitted, or may be transmitted as part of other call handling options—for example, the personal notification may be transmitted before the caller is routed to voicemail or a forwarding number.

What is claimed is:

1. A system for managing telephone calls, comprising:
   a data channel;
   a voice channel;
   a call management system, coupled to the data channel and voice channel, the call management system including a central processing unit, and one or more call management applications, executable by the central processing unit, for handling an incoming call placed by a caller to a subscriber;
   the one or more call management applications including instructions for:
      collecting information about the incoming call placed by the caller to the subscriber, the collected information including the callers's name;
      transmitting over a data channel notification of the incoming call to a computer associated with the subscriber;
      receiving a subscriber entered command transmitted from the subscriber's computer over the data channel;
      in response to receiving the transmitted command, transmitting a first message, to the caller over the voice channel to inform the caller that a second message from the subscriber is forthcoming; and
      transmitting a personal audio message to the caller over the voice channel, the personal audio message including the determined callers's name.

2. The system of claim 1, the one or more call management applications further including instructions for:
   receiving a subscriber-originated message transmitted from the subscriber's computer over the data channel; and
   transmitting the subscriber-originated message to the caller over the voice channel.

3. The system of claim 2, where the subscriber-originated message transmitted from the subscriber's computer is a text message; the one or more call management applications further including a procedure for converting the subscriber-originated message into speech prior to transmitting the message to the caller.

4. The system of claim 3, wherein the data channel includes a data connection through the Internet.

5. The system of claim 1 wherein the data channel includes a data connection through the Internet.

6. The system of claim 1, wherein the first message includes the callers's name.

7. A method for managing telephone calls, comprising the steps of:

with respect to an incoming call by a caller to a subscriber, determining the callers's name;

transmitting over a data channel notification of the incoming call to a computer associated with the subscriber, the notification including the determined callers's name;

receiving a subscriber entered command transmitted from the subscriber's computer over the data channel;

in response to receiving the transmitted command, transmitting a first message to the caller over a voice channel to inform the caller that a second message from the subscriber is forthcoming; and transmitting to the caller over the voice channel a personal audio message specified by transmitted command, the personal audio message including the determined callers's name.

8. The method of claim 7, wherein the first message includes the callers's name.

9. A method for managing telephone calls, comprising the steps of:

transmitting, over a data channel to a computer associated with a subscriber, notification of an incoming call placed by a caller to the subscriber;

receiving subscriber entered commands transmitted from the subscriber's computer over the data channel;

in response to receiving at least one of the transmitted commands, transmitting a first message to the caller over a voice channel to inform the caller that a second message from the subscriber is forthcoming;

receiving a message, comprising the second message, transmitted from the subscriber's computer over the data channel; and transmitting the second message as a spoken, audio message to the caller over the voice channel.

10. The method of claim 9, wherein the message transmitted from the subscriber's computer is a text message; the method including converting the message into speech prior to transmitting the message to the caller.

11. The method of claim 10 wherein the data channel includes a data connection through the Internet.

12. A method for managing telephone calls, comprising the steps of:

transmitting, over a data channel to a computer associated with a subscriber, notification of an incoming call placed by a caller to the subscriber;

receiving a subscriber entered command transmitted from the subscriber's computer over the data channel;

in response to receiving the transmitted command, transmitting a first message to the caller over a voice channel to inform the caller that a second message from the subscriber is forthcoming;

receiving a text message transmitted from the subscriber's computer over the data channel;

translating the text message to speech; and transmitting the translated text message as a spoken, audio message to the caller over the voice channel.

13. The method of claim 12, wherein the data channel includes a data connection through the Internet.

14. A method for managing telephone calls, comprising the steps of:

transmitting notification to a subscriber's computer over a data channel of an incoming call placed by a caller to the subscriber;

receiving a subscriber entered command transmitted from the subscriber's computer over the data channel;

determining the callers's name;

in response to receiving the transmitted command, transmitting a first message, including the callers's name, to the caller over the voice channel to inform the caller that a second message from the subscriber is forthcoming;

receiving a text message transmitted from the subscriber's computer over the data channel;

translating the text message to speech; and transmitting the translated text message as a spoken, audio message to the caller over the voice channel.

15. The method of claim 14, wherein the data channel includes a data connection through the Internet.

16. The method of claim 14, wherein the spoken, audio message includes the callers's name.

* * * * *